A. DROSTE.
EXPOSURE SIGNAL AND FILM GUARD.
APPLICATION FILED MAY 4, 1916.

1,242,157.

Patented Oct. 9, 1917.
2 SHEETS—SHEET 1.

Inventor
August Droste.
By his Attorney
Oscar Geier

UNITED STATES PATENT OFFICE.

AUGUST DROSTE, OF BROOKLYN, NEW YORK.

EXPOSURE-SIGNAL AND FILM-GUARD.

1,242,157.

Specification of Letters Patent.   Patented Oct. 9, 1917.

Application filed May 4, 1916.   Serial No. 95,391.

*To all whom it may concern:*

Be it known that I, AUGUST DROSTE, a citizen of the United States, and a resident of Brooklyn, in the county of Kings and State of New York, have invented certain new and useful Improvements in Exposure-Signals and Film-Guards, of which the following is a specification.

This invention relates to improvements in cameras and particularly to that type in which roll films are used.

The principal object of the invention is to provide means whereby when an exposure of the film has been made a visible signal is displayed, indicating the fact of the exposure, the signal remaining visible until after the film has been adjusted to present a fresh surface for subsequent exposure.

A second object is to so arrange the device that it may be made a part of the camera as originally constructed, or used in the form of an attachment to the existing camera structures.

These and other objects are attained by the novel construction, arrangement and combination of parts hereafter described and shown in the accompanying drawings, forming a material part of this invention, and in which:—

Figure 1:
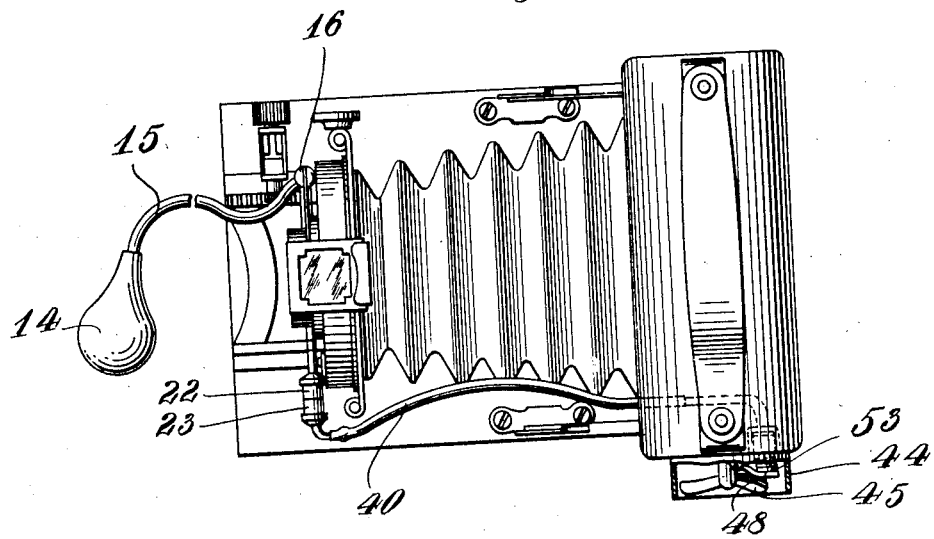
Figure 1 is a plan view of a folding camera, shown in an extended position, and indicating the application of the invention.
Figure 2:
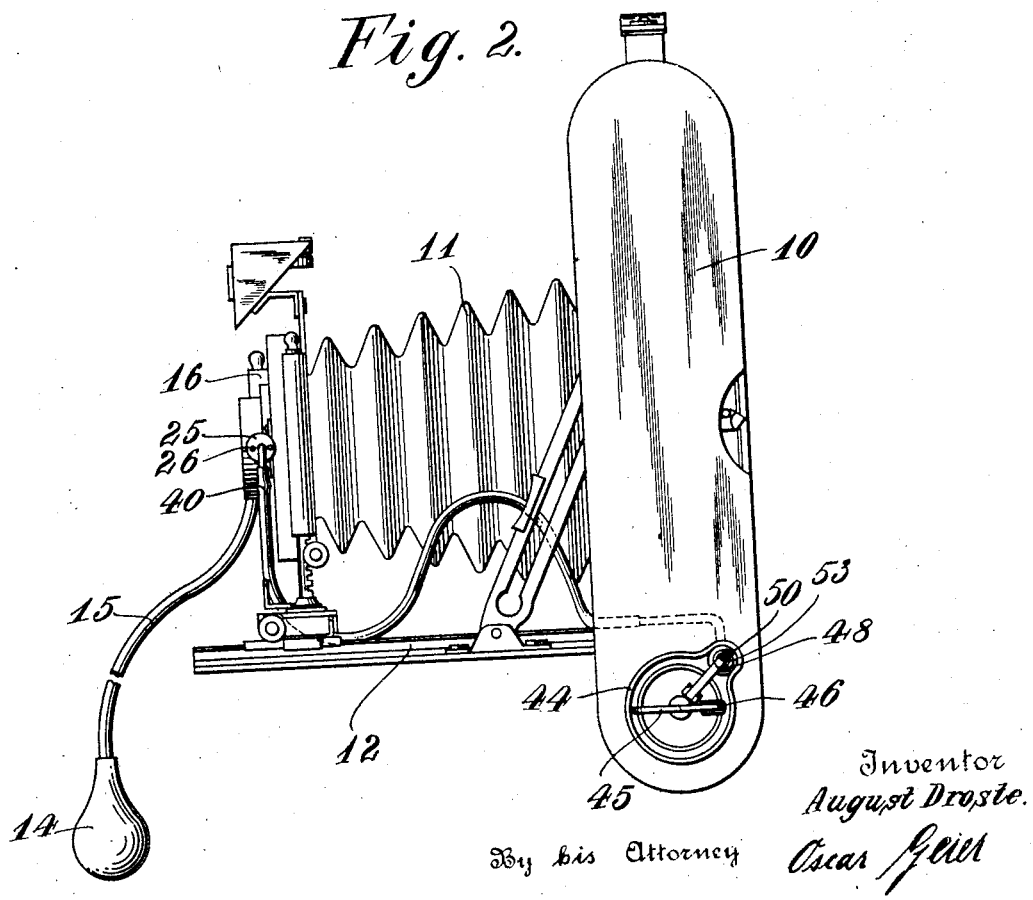
Fig. 2 is a side elevation of the same.
Figure 3:
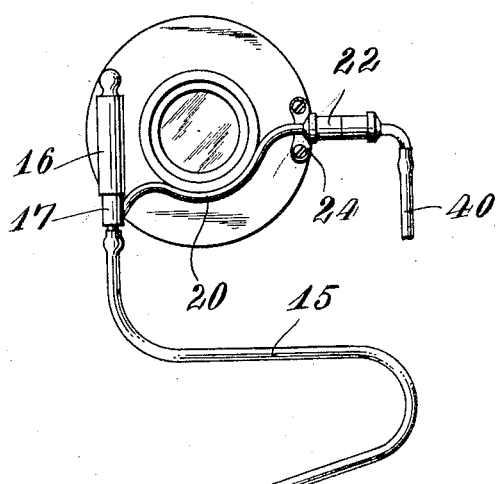
Fig. 3 is an enlarged end view of the lens and shutter device having the attachment as applied to new structures.

In the drawings Figs. 1 and 2 show views of an ordinary form of folding camera, indicating the general operation of the operative parts of the invention as applied thereto.

In these figures the case 10 is shown to be of the pocket or folding type, the focusing bellows 11 being extended, and the support plate 12, which also forms the rear of the casing; the shutter, which may be of the iris or other type, is adapted to be operated automatically by an air current caused by pressing a bulb 14, the same communicating through a flexible tube 15 with the shutter operating device 16, in all respects as such devices are commonly constructed.

Attached to the tube 15 of the shutter operating means, is a tube 20, so disposed as to be inconspicuous, and free from damage, its outer end opening into an opaque cylinder 22 having a transparent portion 23, the cylinder having a cap 25 through which the tube 20 passes, the cap being rigidly engaged with a bracket member 24, secured by screws or otherwise to the end of the camera; the transparent end of the cylinder 23 is likewise provided with a cap 25', both having minute openings 26 for the escape of air.

A plunger 28 is freely slidable within the cylinder, the same being colored as may be desired, preferably red, indicating danger when blown by the air into the transparent portion 23 of the cylinder. In order to prevent inadvertent displacement of the plunger under abnormal conditions as by jars, shocks or otherwise, a detent 30 is held in a transversely formed opening in the plunger, the detent being pressed outward against the wall of the cylinder by the coiled spring 31 and provided with a stem 32 by means of which it is secured from loss should the plunger be removed from the cylinder.

Figure 4:
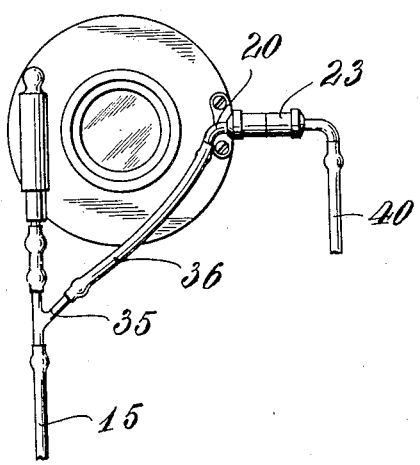
Fig. 4 is a similar view showing the application in the form of an attachment to previously made cameras.
Figures 5, 6:
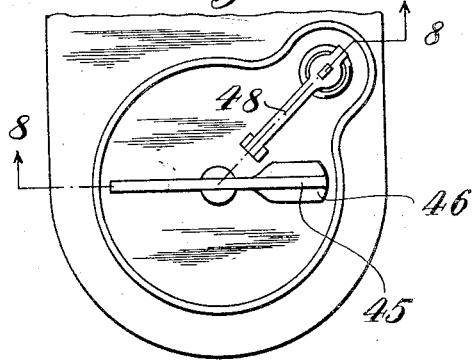
Fig. 5 is a sectional view of the signal indicating device.
Fig. 6 is an end view of the same.
Figures 7, 8:
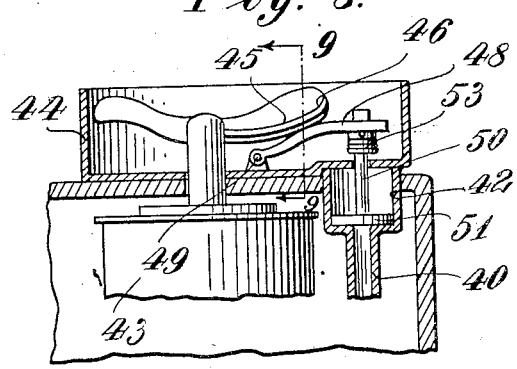
Fig. 7 is an end elevation of the film spool winding means, indicating the application of the signal return means.
Fig. 8 is a sectional view taken on the line 8—8 of Fig. 7.
Figure 9:
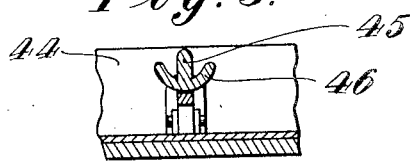
Fig. 9 is a fragmental sectional view taken on the line 9—9 of Fig. 8.

In Fig. 4 a similar device is indicated, the pipe 15 having inserted in it a Y fitting having a branch 35 communicating with a tube 36 leading to a cylinder made as previously described.

In order to cause the plunger to return within the opaque portion of the cylinder, a tube 40 enters the cap 25', the tube extending below the bellows, when the same are in position for use, and communicating with an air compressing cylinder 42 arranged in a recess adjacent to the film roll casing 43, the same being operated by the T shaped handle 45, protected by raised walls 44 so as to guide the fingers in manipulating and guard against damage to the handle.

One arm of the handle is formed with a curved lower flange 46 adapted to make contact as it is turned, with a lever 48 pivoted on a bracket 49 secured in the bottom of the casing 44, its other end engaging with the stem 50 of a plunger 51 operating within the cylinder 42, the lever and plunger stem being normally kept outward by means of a coiled push spring 53. Thus as the handle 45 is rotated, the curved portion 46 is caused to make contact with the lever 48 depressing it and through such action forcing the plunger 51 within the cylinder and causing a current of air to pass through the pipe 40 into the transparent section 23 of the signal cylinder, moving the plunger 28 into its original position, and indicating that the film is in position for exposure.

From the foregoing it will be seen that a device which indicates the condition of the film is presented, and that means are provided for operating the visible signal coincident with exposure of the film, thus avoiding the danger of obtaining a second or cumulative exposures.

Having thus described my invention, what I claim as new and desire to secure by Letters Patent, is:—

1. In a camera having a pneumatic iris shutter operating means, and adapted to use film rolls, a signal device comprising a vertical tube having an opaque and transparent portion, a colored plunger slidable in said cylinder, a friction brake combined with said plunger, means for moving said plunger from the opaque to the transparent portion of said tube, said means being combined with said shutter operation means, and means for returning said plunger to its normal position in the opaque portion of said tube.

2. In a camera having pneumatic shutter operating means, and a roll film operating device, a hollow visible signal casing having transparent and opaque portions, a plunger slidable from one portion to the other of said signal, means for propelling said plunger from the opaque to the transparent portion conjunctively with operating the shutter, a cylinder arranged adjacent to said film operating device, a piston operable therein, means for normally keeping said piston in a raised position, a lever combined therewith, and means formed with said film operating device adapted to depress said lever at each revolution whereby a current of air is forced into the signal casing moving said plunger into its original position.

Signed at New York, in the county of New York, and State of New York, this 10th day of April, 1916.

AUGUST DROSTE.